Oct. 5, 1937. C. J. BRISTOL ET AL 2,095,051

AUTOMOBILE LIFT

Filed Dec. 8, 1934

Inventors
Cyrus J. Bristol
Elmer B. Thompson
by Orwig & Hague Attys

Patented Oct. 5, 1937

2,095,051

UNITED STATES PATENT OFFICE 2,095,051

AUTOMOBILE LIFT

Cyrus J. Bristol and Elmer B. Thompson, Des Moines, Iowa, assignors to Globe Machinery & Supply Company, Des Moines, Iowa, a corporation of Iowa Application December 8, 1934, Serial No. 756,610

2 Claims. (Cl. 254—93)

At the present time there is in general use two well known varieties of automobile lifts, one known as the "roll on" type, and which is characterized by having two trough shaped runways normally flush with the floor when the lift is in a lowered position upon which the automobile wheels are driven, and upon which they remain during the up and down movement of the lift.

One of the major advantages of this type of lift is, that when the lift and automobile are in an elevated position and being serviced, the automobile cannot be pushed sideways off of the runway, and are generally considered as being safe for both the operator and the automobile.

The other variety now in common use is generally known as the "free wheeling" type, and it is characterized by having two parallel rails to normally rest upon the floor surface between the wheels of an automobile when driven in position over the lift, and which rails, or jacks thereon, engage and support the automobile axles when being raised and lowered. This free wheeling type has the advantage of permitting an operator to conveniently and easily service the under surface of an automobile, and specifically to service the automobile brakes and remove the wheels, but has the disadvantage that in some instances it may be pushed off of the lift when in an elevated position.

The object of our invention is to provide an automobile lift of simple, durable and inexpensive construction having the advantageous features of both the "roll on" and "free wheel" types of lifts, and at the same time avoiding the disadvantages thereof.

More specifically, it is our object to provide a lift in which the roll-on runways may, when in lowered position, rest flat against the floor so that an automobile may be conveniently and easily placed thereon, and then the roll-on runways may, if desired, be elevated by the lift in the ordinary manner of a "roll on" lift, or, if desired, the roll-on runways may be permitted to retain their position resting upon the floor, and the free wheeling rails may be elevated until they, or jacks mounted thereon, engage and elevate the automobile to a limited distance, whereupon the roll-on runways are automatically carried upwardly with the free wheeling rails and the automobile so that at any position of the up and down movement of the lift the runways will stand spaced apart a short distance between the automobile wheels, so that the wheels or brakes may be serviced and the wheels removed conveniently and easily, and so that in the event the automobile should be tilted laterally off of the supporting free wheeling rails, the wheels of the automobile would enter the roll-on runways and thereby prevent the automobile from moving off of the lift.

Further in this connection, it is our object to provide a lift of this class in which, if so desired, the operator may leave the roll-on runways in their position upon the floor and then raise and lower the lift in the manner of a free wheeling lift, with all of the advantages as to accessibility of such lifts.

Our invention consists in the construction, arrangement and combination of the various parts of the device, whereby the objects contemplated are attained, as hereinafter more fully set forth, pointed out in our claims, and illustrated in the accompanying drawing, in which:

Figure 2:
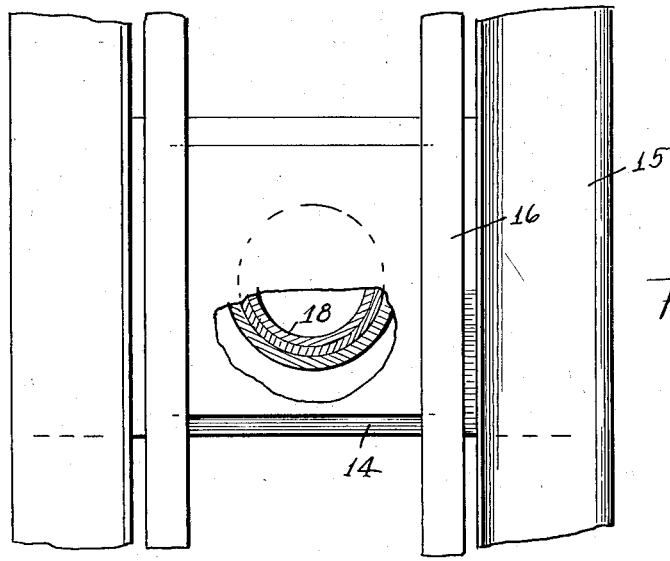
Figure 2 is a top or plan view of the central portion of said lift, with parts broken away to show the double piston and cylinder arrangement.
Figure 3:
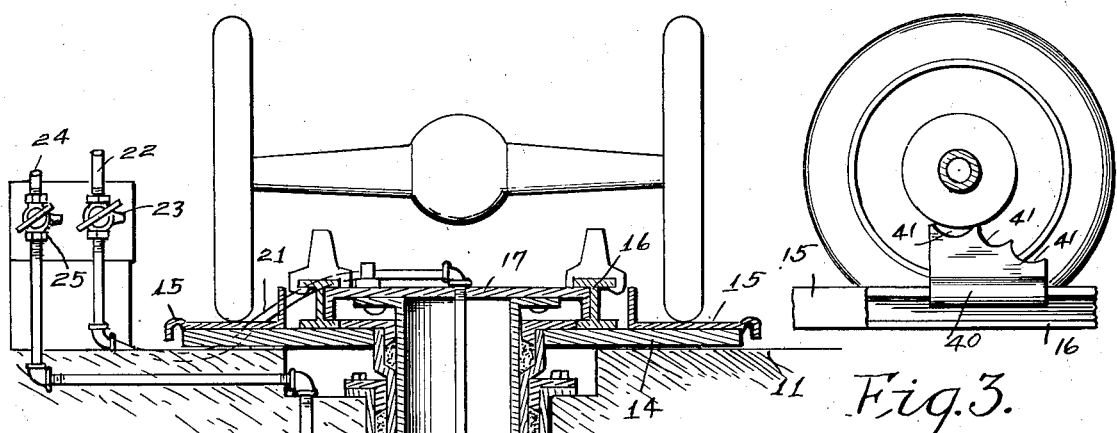
Figure 3 shows a side elevation of one of the free wheeling rail members, with a jack device thereon, and an automobile axle and wheel in position above the jack, to be engaged and supported thereby when the jack is elevated.

Referring to the accompanying drawing I have used the reference numeral 10 to indicate generally a cylinder mounted in an upright position with its upper end below the level of the floor 11. Slidingly mounted within this cylinder is a piston 12, formed hollow, and having a bottom member 13, and open at its top. Fixed to the upper end of this piston 12 is a platform 14, and mounted upon and supported by this platform are the roll-on runways 15, of ordinary construction.

Resting upon the platform 14 between the roll-on runways 15 are the free wheel rails 16, of ordinary construction. These free wheel rails are connected together by means of a supporting plate 17.

Slidingly mounted within the hollow piston 12 is a second piston 18, having a closed bottom 19, and having its upper end projected above the upper end of the piston 12, and fixed to the plate 17. A pipe 20 is extended down through the center of this piston 18 into the space between the piston bottom members 13 and 19, and at the top of the pipe 20 there is a flexible hose 21 connecting it to a pipe 22 in which fluid under pressure is contained, and a manually controlled valve 23 is provided in this pipe 22. A similar pipe 24 is connected to the source of fluid supply under pressure and is controlled by a manually operable valve 25, and leads to the space between the bottom of the cylinder 10 and the bottom 13 of the piston 12.

Figure 1:
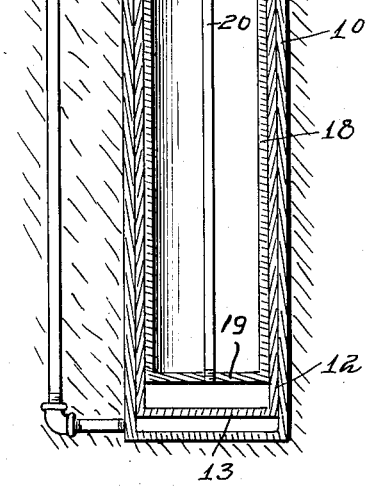
Figure 1 shows a vertical transverse central sectional view of a lift embodying our invention, with a portion of an automobile mounted upon the roll-on runways thereof.

By this means, and assuming that the operator desires to elevate the roll-on runways and the free wheel rails in unison so that the lift may function in the manner of the ordinary roll-on lift, the operator opens the valve 25 and permits fluid, under pressure, to raise the piston 12 in the ordinary manner. This will elevate the platform 14, and since the free wheel rails rest upon said platform, the free wheel rails will be elevated with the platform; and since these free wheel rails do not normally engage an automobile axle when in position, as shown in Figure 1, the lift can be thereby operated as a "roll-on" lift and the free wheel rails will not in any way interfere with this movement of the lift.

Assuming that it is desired to operate the lift as a free wheel lift, then the operator opens the valve 23, whereupon air under pressure is admitted to the space between the bottom 19 of the piston 18 and the bottom 13 of the piston 12. When this is open the piston 12 remains in its lowered position and is firmly held in position by the fluid pressure upon the bottom 13. The piston 18, however, is raised until the free wheel rails, or jacks thereon, engage the automobile axle and lift the automobile in the manner of the ordinary "free wheel" lift.

In the event, however, that it is desired to operate the lift in a manner combining the advantages of a "free wheel" lift and a "roll on" lift, then the operator manipulates the valves 23 and 25 to raise the automobile to the desired height, and then lower the roll-on runways to the desired distance beneath the automobile wheels for servicing or removing them, and at the same time having the roll-on runways so close to the automobile wheels that in the event that pressure should be applied to the automobile in a manner tending to tilt it laterally from the free wheel supporting members, then the roll-on runways will be in position to engage the wheels and prevent the automobile from slipping laterally off of the lift.

In the event that the lift was in its elevated position and the operator was working on the automobile from below, and in the further event that the roll-on runways and the platform 14 should be in the way of some part of the automobile upon which the operator desires to work, then the operator may maintain the free wheel rails in their elevated position, and lower the roll-on runways down to the floor surface, thus fully exposing the under surface of practically the entire automobile.

In practical use with our invention, and assuming that it is desired to operate the lift in a manner having all of the convenience and safety of the ordinary "roll on" lift and at the same time having the advantages of a "free wheeling" lift as to the servicing of the wheels and brakes of an automobile thereon, then when the lift is being elevated it is so manipulated by the operator that the free wheel rails, or jacks thereon, will first engage the automobile axles and elevate them a short distance above the roll-on runways. Then, during the further elevation of the lift, the roll-on runways will move upwardly to any desired height and maintain the same spaced apart position with relation to the free wheel rails, so that in the event that the automobile on the lift should be tilted laterally, it will not fall, but the wheels will engage and rest upon the roll-on runways.

In the event that it is desired to use the lift in the manner of an ordinary "roll on" lift, then the parts are so adjusted that, as the piston 12 is raised, both the roll-on runways and the free wheel rails will be jointly elevated with it and will maintain their same relative positions.

Further, in the event that it is desired to use the lift in the manner of an ordinary "free wheeling" lift, then the roll-on runways and their supporting platform may be permitted to rest in their normal position substantially flush with the floor surface, and the free wheeling rails and their supports will be elevated to any desired position in the ordinary manner.

One of the advantages of our invention is that, under all circumstances, the automobile may be driven upon the roll-on runways when they are in their position substantially flush with the floor surface, to thereby avoid probable injury or damage to the automobile such as might be caused by having the roll-on runways elevated above the surface when the automobile is driven on it. Furthermore, it is advantageous at times to have the roll-on runways substantially flush with the floor surface so that automobiles may be pushed to position upon the roll-on runways without operating the automobile engine.

With our improvement, and when an automobile has been placed upon the roll-on runways, then it is always accurately centered relative to the free wheel rails, so that when the free wheel rails are elevated to position for raising the automobile out of the roll-on runways, then the automobile will be properly balanced upon the free wheel rails.

We claim as our invention:

1. In an automobile lift, the combination of a roll-on automobile supporting member, a free wheel automobile supporting member arranged with its axle engaging rails between the roll-on runways and normally supported for up and down movement by a portion of the roll-on member, a cylinder, a piston within the cylinder, said piston being operatively connected to said roll-on member for raising and lowering it, and being formed hollow and open at its upper end, and a second piston within the first operatively connected with the free wheel member for raising or lowering it independently of the roll-on member, or jointly therewith.

2. In an automobile lift, the combination of a roll-on automobile supporting member, a free wheel automobile supporting member arranged with its axle engaging rails between the roll-on runways and normally supported for up and down movement by a portion of the roll-on member, a cylinder, a piston within the cylinder, said piston being operatively connected to said roll-on member for raising and lowering it, and being formed hollow and open at its upper end, a second piston within the first operatively connected with the free wheel member for raising or lowering it independently of the roll-on member, or jointly therewith, manually controlled means for delivering fluid under pressure to the space between the bottom of the cylinder and the bottom of the first piston, and manually controlled means for delivering fluid under pressure to the space between the bottoms of the first and second pistons.

CYRUS J. BRISTOL.
ELMER B. THOMPSON.